(12) United States Patent
Dittmer

(10) Patent No.: US 6,905,101 B1
(45) Date of Patent: Jun. 14, 2005

(54) ADJUSTABLE, SELF-BALANCING FLAT PANEL DISPLAY MOUNTING SYSTEM

(75) Inventor: Jay Dittmer, Prior Lake, MN (US)

(73) Assignee: Chief Manufacturing Inc., Savage, MN (US)

( * ) Notice: Subject to any disclaimer, the term of this patent is extended or adjusted under 35 U.S.C. 154(b) by 0 days.

(21) Appl. No.: 10/449,833

(22) Filed: May 30, 2003

Related U.S. Application Data

(60) Provisional application No. 60/387,815, filed on Jun. 11, 2002.

(51) Int. Cl.$^7$ ............................................... E04G 3/00
(52) U.S. Cl. ............................... 248/274.1; 248/125.7
(58) Field of Search ..................... 248/125.7, 125.9, 248/123.11, 919, 918, 289.11, 284.1, 274.1

(56) References Cited

U.S. PATENT DOCUMENTS

| | | | |
|---|---|---|---|
| 3,574,340 A | 4/1971 | Busche | |
| 4,814,759 A | 3/1989 | Gombrich | |
| 5,165,644 A * | 11/1992 | Allen ........................ | 248/285.1 |
| 5,322,255 A | 6/1994 | Garrett | |
| 5,520,361 A | 5/1996 | Lee | |
| 5,553,820 A * | 9/1996 | Karten et al. ............. | 248/286.1 |
| 5,713,549 A * | 2/1998 | Shieh ........................ | 248/284.1 |
| 5,743,503 A * | 4/1998 | Voeller et al. ............ | 248/284.1 |
| 5,842,672 A | 12/1998 | Sweere et al. | |
| 5,854,735 A | 12/1998 | Cheng | |
| 5,924,665 A | 7/1999 | Sweere et al. | |
| 5,941,493 A | 8/1999 | Cheng | |
| 5,992,809 A | 11/1999 | Sweere et al. | |
| 6,015,120 A | 1/2000 | Sweere et al. | |
| 6,019,332 A | 2/2000 | Sweere et al. | |
| 6,045,103 A | 4/2000 | Costa et al. | |
| 6,102,348 A | 8/2000 | O'Neill | |
| 6,189,850 B1 | 2/2001 | Liao et al. | |
| 6,340,146 B1 | 1/2002 | Tzeng | |
| 6,347,776 B1 | 2/2002 | Chuang | |
| 6,354,549 B2 | 3/2002 | Sweere et al. | |
| 6,361,012 B1 | 3/2002 | Chang | |
| 6,378,830 B1 | 4/2002 | Lu | |
| 6,394,403 B1 | 5/2002 | Hung | |
| 6,402,109 B1 | 6/2002 | Dittmer | |
| 6,416,027 B1 | 7/2002 | Hart | |
| 6,418,010 B1 | 7/2002 | Sawyer | |
| 6,419,196 B1 | 7/2002 | Sweere et al. | |
| 6,453,509 B1 | 9/2002 | Shin | |
| 6,478,275 B1 * | 11/2002 | Huang ....................... | 248/284.1 |
| 6,484,987 B2 | 11/2002 | Weaver | |
| 6,494,429 B2 | 12/2002 | Tajima | |
| 6,543,734 B2 | 4/2003 | Yeh | |
| 6,554,242 B2 | 4/2003 | Kim | |
| 6,559,829 B1 | 5/2003 | Matsuo et al. | |
| 6,560,094 B2 | 5/2003 | Schmidt | |
| 6,575,419 B1 | 6/2003 | Masuda et al. | |

(Continued)

Primary Examiner—Leslie A. Braun
Assistant Examiner—A. Joseph Wujciak
(74) Attorney, Agent, or Firm—Patterson, Thuente, Skaar & Christensen, P.A.

(57) ABSTRACT

A self-balanced adjustable mounting system for a flat panel display. When a flat panel display is attached to the mounting system, the display is adapted to revolve about a substantially horizontal axis extending proximate a center of gravity of the display. The system may be self-balancing at a plurality of locations about the axis.

16 Claims, 9 Drawing Sheets

U.S. PATENT DOCUMENTS

| | | |
|---|---|---|
| 6,585,203 B1 | 7/2003 | Euker |
| 6,592,090 B1 * | 7/2003 | Li .......................... 248/284.1 |
| 6,594,143 B2 | 7/2003 | Yano et al. |
| 6,752,363 B2 * | 6/2004 | Boele ...................... 248/183.1 |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0179801 A1 | 12/2002 | Kim |

* cited by examiner

ADJUSTABLE, SELF-BALANCING FLAT PANEL DISPLAY MOUNTING SYSTEM

RELATED APPLICATIONS

This application claims the benefit of U.S. Provisional Application No. 60/387,815, filed on Jun. 11, 2002, hereby incorporated herein in its entirety by reference.

FIELD OF THE INVENTION

The present invention relates to flat panel display mounting systems, and more particularly to selectively adjustable flat panel display mounting systems.

BACKGROUND OF THE INVENTION

Flat panel displays have become an increasingly popular substitute for projection devices and CRT's. The flat panel display is typically mounted on a structure, such as a wall. Flat panel displays, especially LCD displays, are typically most clearly viewable from a position directly in front of the display. The display image is often too dark or not visible at all if viewed from a significant angle.

It is thus preferable that the angle of a flat panel display can be adjusted for optimum viewing. Various prior art positioning devices have been used, such as friction based hinges, mechanical linkages with springs or other biasing devices, and various mechanical latches. The friction based devices need to be sufficiently strong to hold a relatively heavy flat panel displays, while being easy to operate.

Traditional friction based devices and mechanical latches often require one person to hold the flat panel display at the correct angle, while a second person adjusts the device. Movement in the upward direction requires the operator to lift a substantial portion of the weight of the flat panel display. In some instances, the operator must also overcome the resistance of the positioning device.

Also, the hinge and pivot joints used in prior devices typically enable positioning of the display about only one axis per joint. The degree of display position adjustability of such devices is limited by the number of joints that can be economically and practically provided.

Mechanical linkages with springs are expensive to build. For example, U.S. Pat. No. 6,419,196 (Sweere et al.) discloses a multi-jointed, pivoted support arm to support and position a flat panel display that uses a nitrogen gas spring counterbalance mechanism. What is needed in the industry is a low-cost, easy to operate, and relatively maintenance free system for mounting and positioning flat panel displays that also offers a high degree of adjustability for display positioning.

SUMMARY OF THE INVENTION

The present invention is a mounting system for a flat panel display that substantially meets the aforementioned needs of the industry. The mounting system includes a display interface adapted to receive the flat panel display so that the flat panel display and the display interface together define a center of gravity. The display interface and the support structure are operably coupled so that the flat panel display is selectively revolvably positionable about a substantially horizontal axis extending proximate the center of gravity.

The above described configuration enables the flat panel display to be selectively positioned in a virtually infinite number of positions about the axis and within the range of travel of the device. The location of the axis proximate the center of gravity of the display and display interface enables self-balancing so that a virtually equal effort is required to revolvably position the display in any desired position. Also, since the display is substantially vertically balanced, a relatively low effort is required so that positioning can be accomplished by an individual user.

According to the invention, an adjustable, self-balancing, mounting system adapted for mounting a flat panel display on a fixed structure includes a support structure adapted to attach to the fixed structure, at least one follower operably coupled to the support structure, and a display interface adapted to receive the flat panel display so that said display interface and said flat panel display together define a center of gravity. The display interface has a first curved guide structure defined therein. The first curved guide structure has a substantially constant radius of curvature with a center disposed proximate the center of gravity. The display interface is operably coupled to the support structure with the follower engaged with the first curved guide structure so that the flat panel display is thereby generally selectively rotatably positionable about an axis extending through the center.

Further, a method of adjustably mounting a flat panel display to a fixed structure includes the steps of:
 (a) attaching the flat panel display to a display interface so that the flat panel display and the display interface together define a center of gravity;
 (b) forming a curved guide structure in the display interface, the guide structure having a substantially constant radius of curvature with a center proximate the center of gravity;
 (c) coupling a support structure to the display interface, the support structure having an follower engaged in the guide structure so that the display interface and the flat panel display are generally selectively rotatably positionable about an axis extending substantially through the center of the radius of curvature; and
 (d) attaching the support structure to the fixed structure.

An adjustable, self-balancing, mount for mounting a flat panel display on a fixed structure according to the invention includes a pair of body portions including a first body portion adapted to attach to the fixed structure and a second body portion adapted to receive the flat panel display so that the second body portion and the flat panel display together define a center of gravity. One of the pair of body portions has a guide structure and the other of the pair of body portions is operably coupled with a follower engaged with the guide structure. The pair of body portions are operably coupled so that the flat panel display is selectively revolvably positionable at least about a substantially horizontal axis along a path of travel defined by the guide structure. The path of travel is defined so that the center of gravity remains substantially stationary as the flat panel display is positioned along the path of travel.

DETAILED DESCRIPTION OF THE PREFERRED EMBODIMENTS

The present invention includes a self-balancing adjustable mounting system adapted to receive a flat panel display such that a center of gravity is established when the display is attached to the mounting system. The mounting system provides revolving movement of the flat panel display at least about a substantially horizontal axis that extends approximately through the center of gravity. Because rotation of the flat panel display occurs about an axis extending approximately through the center of gravity, the mounted flat panel display may be easily rotated through a path of travel about a portion of the axis and may be self-balanced at a plurality of locations without a retaining or locking system and with minimal frictional resistance. The center of gravity remains substantially stationary as the display is positioned along the path of travel. The present mounting system is substantially infinitely adjustable throughout the range of motion.

Figure 1:
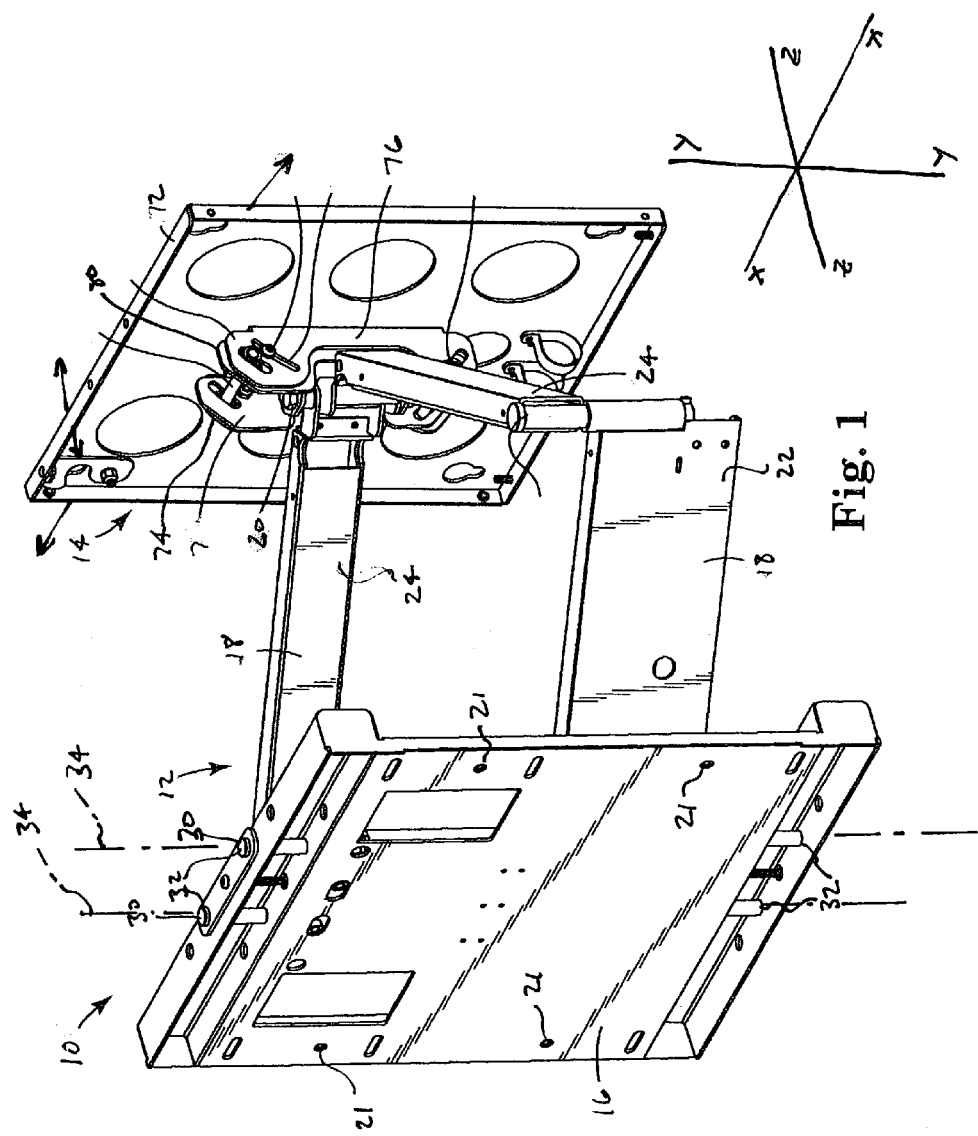
FIG. 1 is a perspective view of a flat panel display mounting system in accordance with the present invention.

FIG. 1 depicts an embodiment of the present invention in which an adjustable mounting system 10 generally includes a support structure 12, and a display interface 14. Support structure 12 generally includes a mounting plate 16, a pair of articulating arm assemblies 18, and a connecting bracket 20. Mounting plate 16 is attachable to any fixed structure, for example a wall, ceiling, or framework of a building, with any suitable means including fasteners extending through apertures 21 into the fixed structure.

FIG. 1 also designates, for reference purposes, the relative directions of x-y-z coordinates as applied to the mounting system. Any reference herein to movement in an x-axis direction, a y-axis direction, or a z-axis direction relates to these coordinate axes. The y-axis is oriented up and down, the z-axis is fore-and-aft, and the x-axis is perpendicular to the z-axis and the y-axis, and is oriented laterally from side-to-side of the mounting system.

Figure 4:
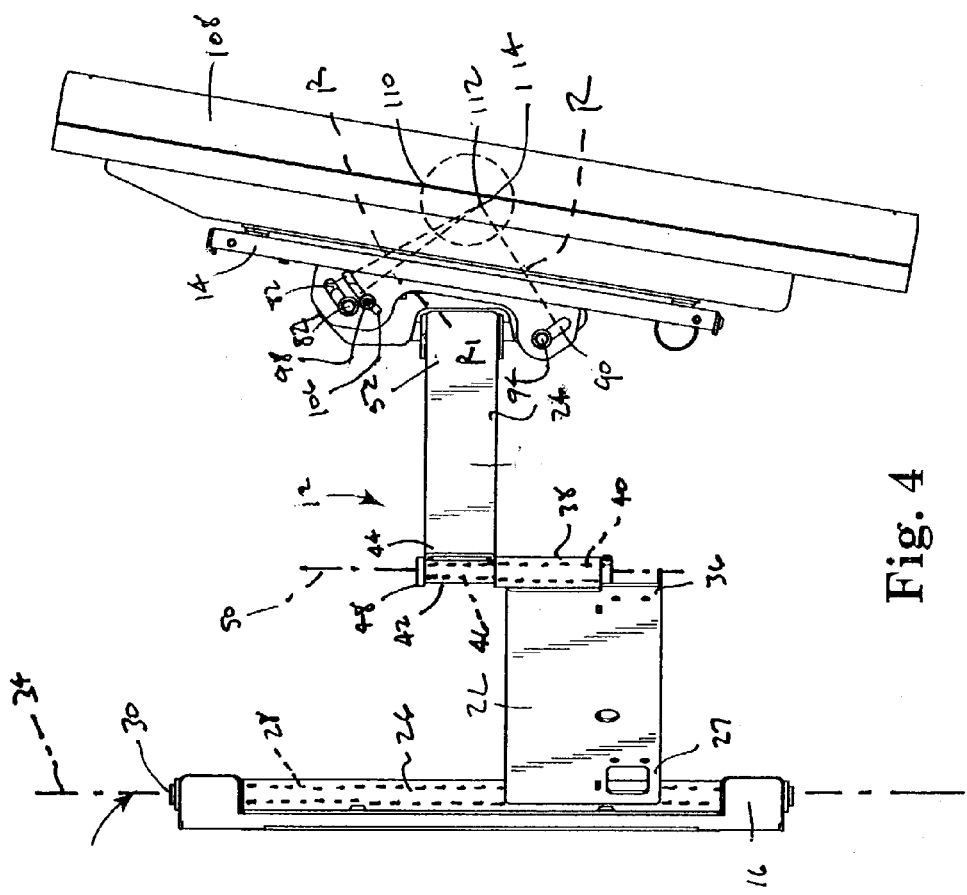
FIG. 4 is a side view of a flat panel display attached to the mounting system.

Articulating arm assemblies 18 each generally include a primary arm 22 and a secondary arm 24. As depicted in FIG. 4, primary arm 22 has a fitting 26 at proximal end 27 presenting a vertically oriented bore 28 for rotatably receiving a hinge pin 30 therethrough. Hinge pin 30 extends between and is retained in vertically oriented apertures 32 in mounting plate 16. Primary arm 22 is thus hinged from mounting plate 16, and is rotatable about a substantially vertical axis 34 extending through each hinge pin 30. Similarly, distal end 36 of primary arm 22 has a fitting 38 presenting a vertically oriented bore 40. A fitting 42 at proximal end 44 of secondary arm 24 presents a vertically oriented bore 46. A hinge pin 48 extends through bore 46 and bore 40, connecting primary arm 22 and secondary arm 24 so that the arms are hinged about a substantially vertical axis 50 extending axially through hinge 48.

The distal ends 52 of secondary arms 24 each have a bracket 54 thereon. Each bracket 54 includes a pair of spaced apart parallel flanges 56 with an inwardly directed cylindrical boss 58 having a bore therethrough. Connecting bracket 20 has a pair of spaced apart flanges 60, 62, having vertically aligned apertures for receiving a bolt 64. Bolt 64 extends through the apertures in flanges 60, 62, and bushings 66, as well each cylindrical boss 58 of brackets 54 so that connecting bracket 20 is pivotally attached to secondary arms 24 about a substantially vertical axis 68 extending through bolt 64. Bolt 64 is retained in place with nut 70.

Articulating arm assemblies 18, by virtue of the arrangement described above, enable side-to-side positioning along the x—x axis as well as fore-and aft positioning along the z—z axis of display interface 14 relative to mounting plate 16 as depicted by the arrows in FIG. 1. Further, the pivoting connection of connecting bracket 20 with secondary arms 24 enables rotation of connecting bracket 20 about axis 68 so that a flat panel display attached to connecting bracket 20 is tiltable from side-to-side.

Display interface 14 generally includes a body portion 72 with a pair of projecting flanges 74, 76. Body portion 72 is adapted to receive a flat panel display thereon by any conventional means, including brackets, fasteners, screws or adhesive. Connecting bracket 20 has a pair of spaced apart vertically oriented flanges 78, 80, adapted to fit between flanges 74, 76, as depicted best in FIG. 2. Each flange 74, 76 has a guide structure in the form of slots 82. An interface member, in the form of follower pin 84, engages in slots 82 and is retained by washers 86. Follower pin 84 may slide or roll in slots 82.

Figure 2:
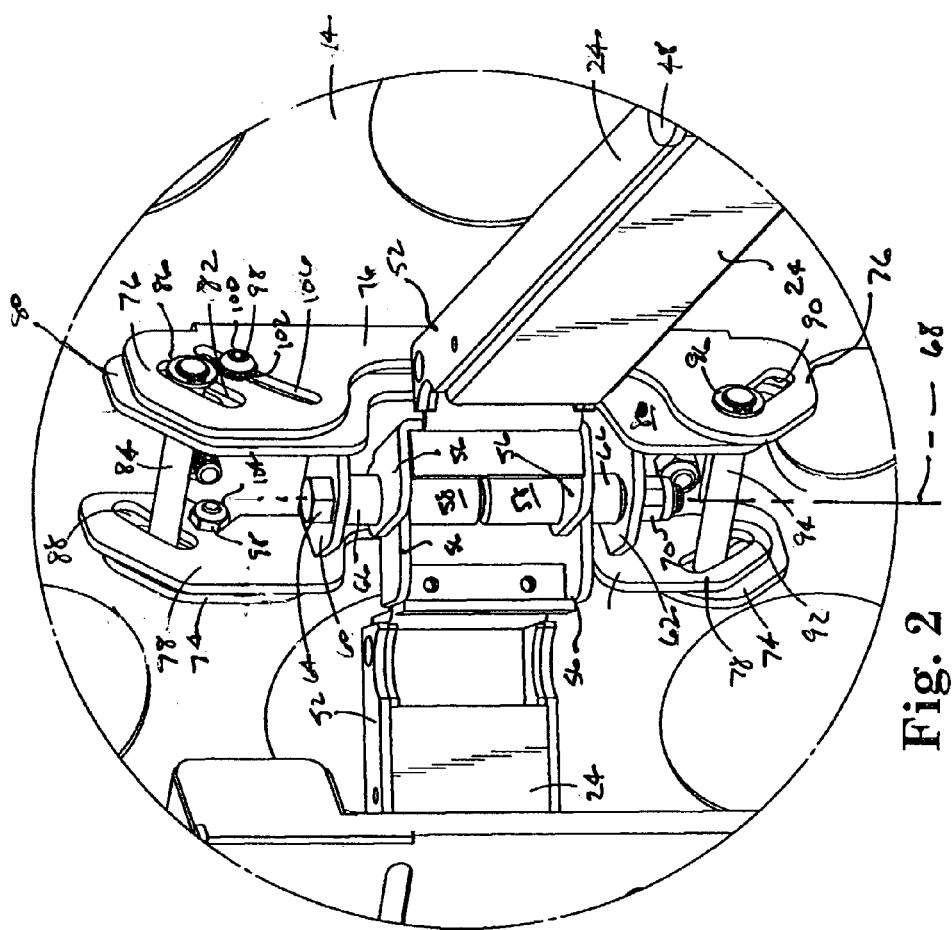
FIG. 2 is a partial view of a display interface and support structure in accordance with the present invention.
Figure 3:
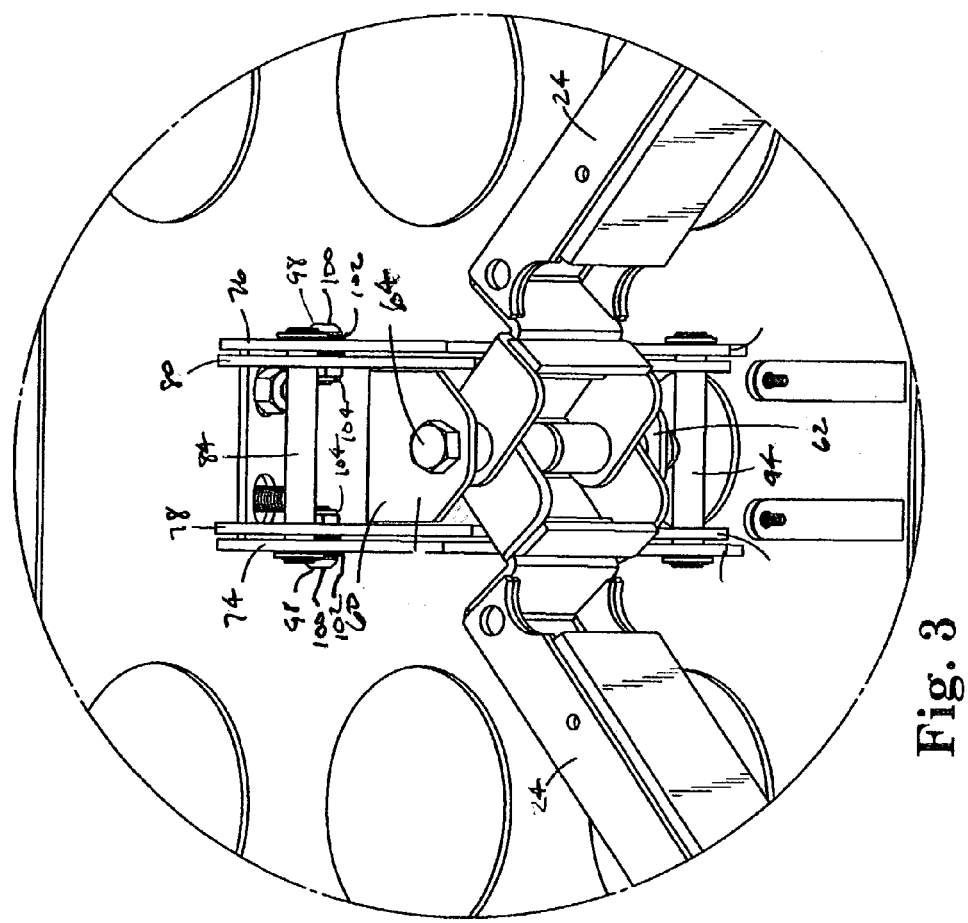
FIG. 3 is a partial perspective view of a portion of the support structure and display interface of FIG. 2.

Follower pin 84 may engage with connecting bracket 20 by any suitable means. As depicted in FIGS. 1 and 2, follower pin 84 is disposed so as to slide or roll in support structure slots 88 in flanges 78, 80, which are positioned so as to correspond with slots 82. Support structure slots 88 advantageously enable follower pin 84 to roll freely therein and increase the relative range of vertical rotational travel of display interface 14. Alternatively, however, other interface member and guide structure arrangements are contemplated. For example, follower pin 84 may be fixed between flanges 78, 80, of connecting bracket 20 so that portions project from either side to engage slots 82. Follower pin 84 may include a ball or roller bearing arrangement for engaging slot 82. In another alternate embodiment, follower pin 84 may be fixed between the flanges 74, 76, but slide freely in support structure slots 88 in connecting bracket 20.

It will be readily appreciated that follower pin 84 may be replaced by any other suitable sliding or rolling follower mechanism or arrangement. It will also be readily appreciated that slots 82 and 88 may be replaced by any other suitable guide structure capable of receiving a follower. For example, either or both of slots 82, 88, may be replaced with a channel adapted to receive a suitable follower.

A second pair of guide structures in the form of slots 90 may be provided in flanges 74, 76. Again, flanges 78, 80, may have corresponding slots 92. A second follower 94 retained with washers 96 may be disposed so as to slide or roll in slots 90, 92.

One or more optional adjustable friction assemblies 98 may be provided to add friction for fixing the position of display interface 14 at any desired position in the range of travel. Each friction assembly 98 generally includes a fastener 100, a friction washer 102, and a nut 104. Each fastener 100 extends through friction slot 106 in display interface 14 and a corresponding aperture in connecting bracket 20. Nut 104 may be tightened to compress friction washer 102 against the flanges of display interface 14, thereby adding friction for resisting relative movement of display interface 14 and connecting bracket 20.

Friction washer 102 may be made from any suitably durable material. Currently, it is most preferable that friction washer 102 be made from ultra high molecular weight polyethylene (UHMWPE) material for its superior lubricity, abrasion resistance, toughness, and freedom from stress cracking.

Figure 5:
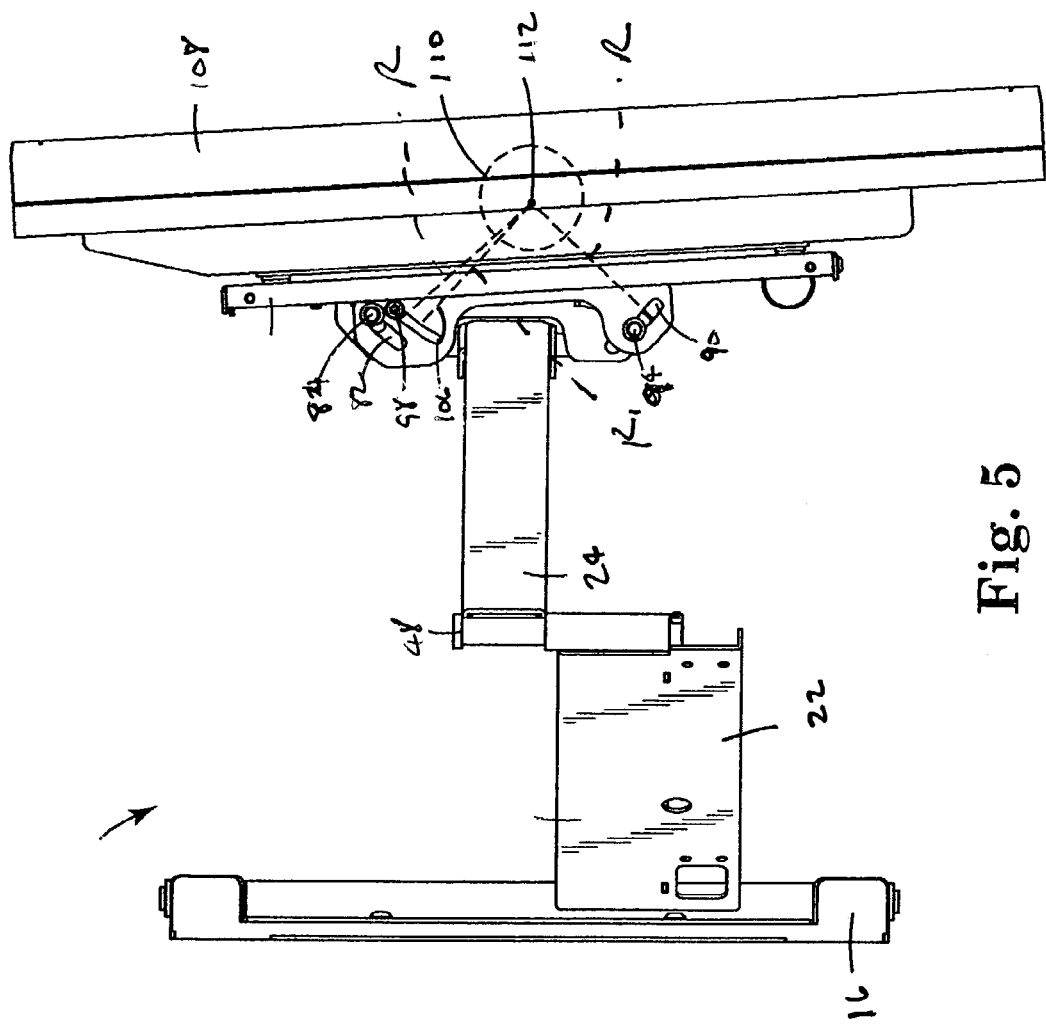
FIG. 5 is similar to FIG. 4, but with the flat panel display and display interface positioned at a different angle.
Figure 6:
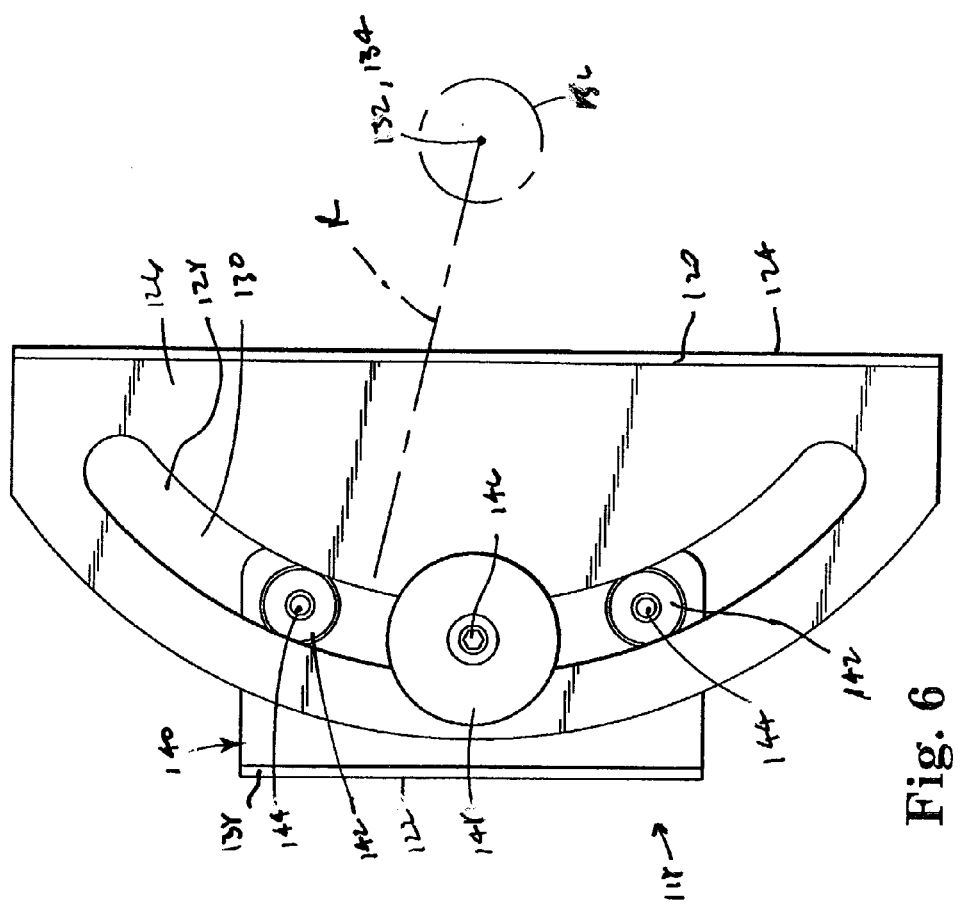
FIG. 6 is a side view of an alternative embodiment of a mounting system in accordance with the present invention.
Figure 7:
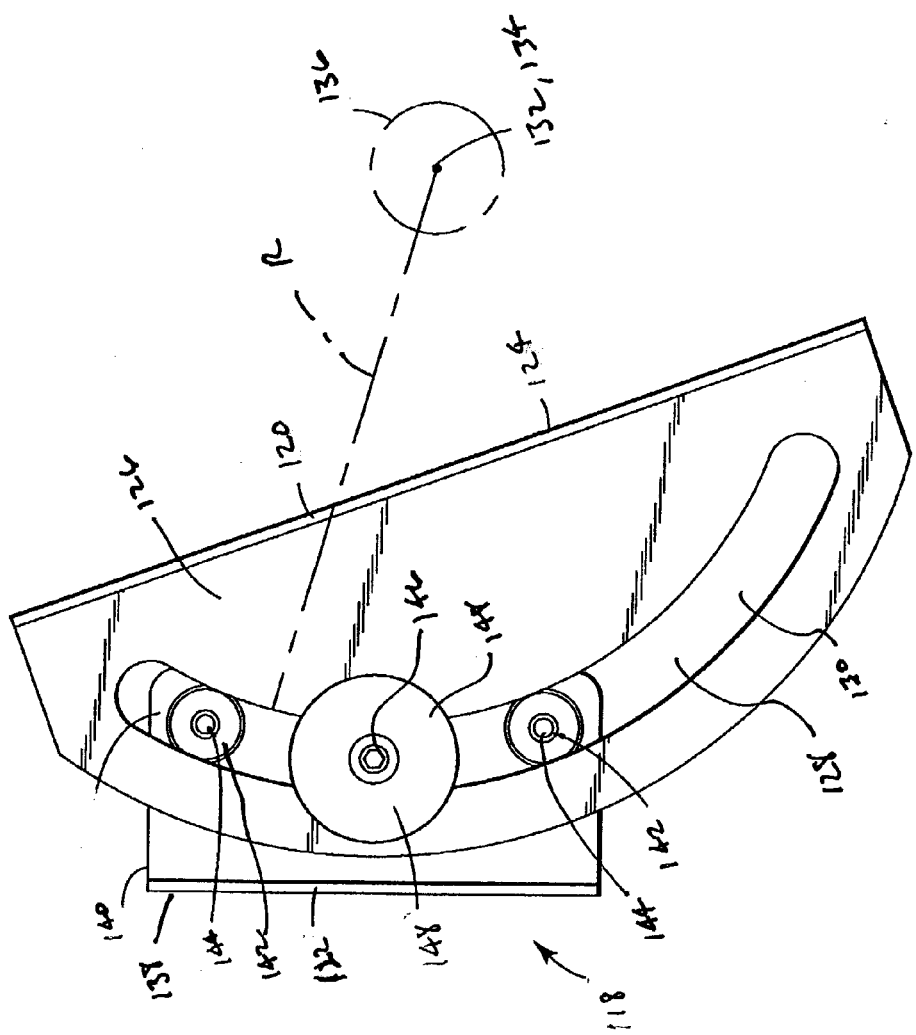
FIG. 7 is similar to FIG. 6, but with the display interface positioned at a different angle relative to the structure support bracket.
Figure 8:
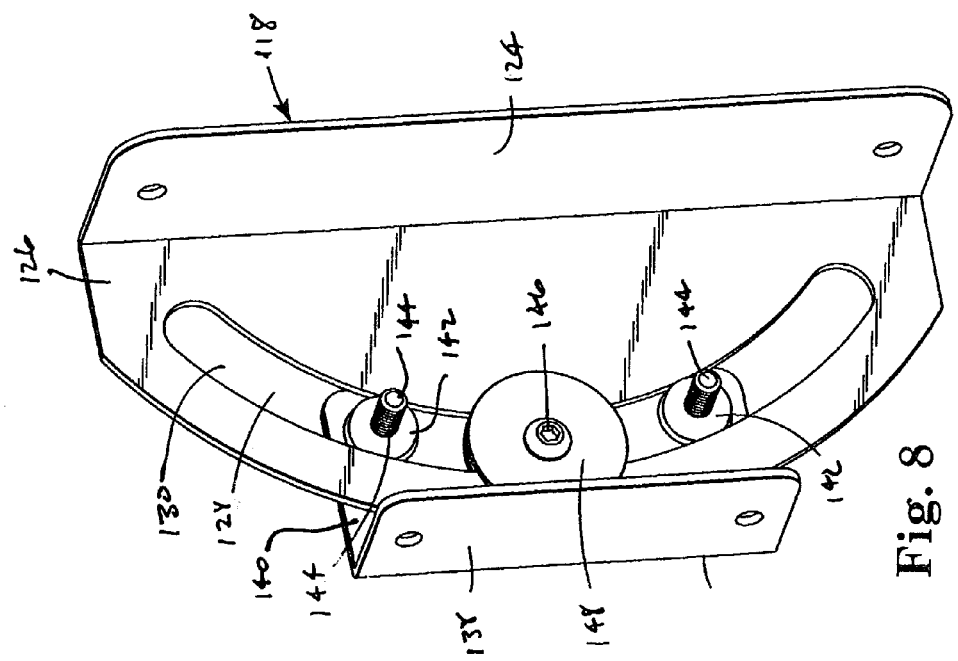
FIG. 8 is a perspective view of the embodiment of FIG. 6.
Figure 9:
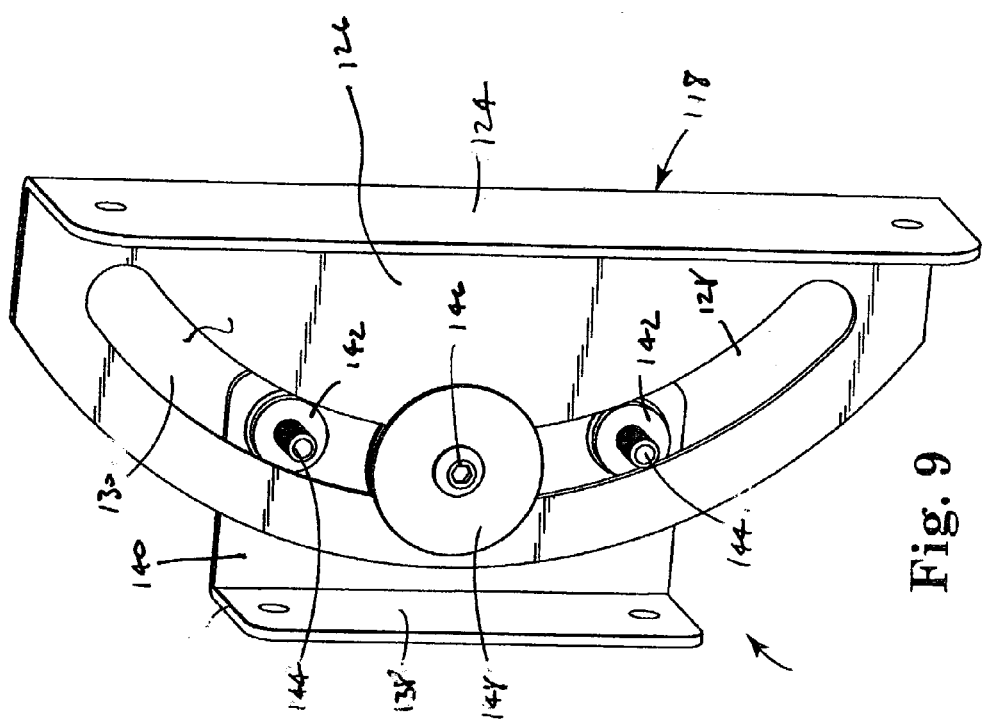
FIG. 9 is another perspective view of the embodiment of FIG. 6.

FIGS. 4 and 5 depict a flat panel display 108 mounted on display interface 14 and positioned in various positions. The flat panel display 108 and the display interface 14 together define a center of gravity 110. Center of gravity 110 is depicted as a circle representing an approximate range of locations for the actual point center of gravity. It will be readily appreciated that the point center of gravity will vary depending on the weight distribution of the particular flat panel display 108 attached to the mounting system, and the weight distribution of display interface 14.

In the invention, slots 82, 90 are curved, having a generally constant radius of curvature, annotated R in the drawings. Radius of curvature R has a center 112 coincident with a substantially horizontal axis 114. Slots 82 and 90 serve as guides for followers 84, 94, enabling flat panel display 108 to revolve about axis 114, and defining a path of travel for the revolving movement. As depicted, display interface 14 is positioned so that axis 114 extends through or proximate center of gravity 110. It will be appreciated that as flat panel display 108 is revolved through the path of travel defined by slots 82 and 90, center of gravity 110 remains substantially stationary.

It will be appreciated that, since axis 114 substantially coincides with center of gravity 110, flat panel display 108 and the attached display interface 14 are substantially vertically balanced. As a result, substantially the same effort is required to revolve flat panel display 108 in the upward direction as in the downward direction. The mounting system is self-balanced and advantageously easy to rotate, but still may be positioned at a plurality of locations without the need for locking structure. This characteristic makes embodiments of the present invention particularly suitable for use with flat panel displays, which may be quite heavy and difficult to maneuver.

Of course it will be appreciated that slots 88, 92, may have a radius of curvature R with a center corresponding with axis 114 so as to function in concert with slots 82, 90. In addition, friction slots 106 may have a different substantially constant radius of curvature, annotated R1 in the drawings, but having a center substantially coincident with axis 114.

FIGS. 6–9 illustrate an alternative embodiment of a mounting system 118 requiring only one guide structure. Mounting system 118 generally includes a display interface 120 and a support structure bracket 122.

Display interface 120 has a first portion 124 for engaging a flat panel display and a substantially perpendicular flange portion 126. Flange portion 126 has a guide structure 128 in the form of a slot 130. Slot 130 is curved, having a generally constant radius of curvature, annotated R in the drawings. Radius of curvature R has a center 132 coincident with a substantially horizontal axis 134. Again, center 132 is located coincident with or substantially proximate the center of gravity 136 defined by a flat panel display (not depicted) together with display interface 120.

Support structure bracket 122 has a first portion 138 for engaging a support structure (not depicted) and a substantially perpendicular flange portion 140. Followers 142 roll or slide in slot 130. Followers 142 may be secured to support structure bracket 122 with fasteners 144. Fastener 146 extends through slot 130 from the opposite side and holds display interface 120 and a support structure bracket 122 in engagement with washer 148.

All of the patents and patent applications disclosed herein, including those set forth in the Background of the invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. An adjustable, self-balancing, mounting system adapted for mounting a flat panel display on a fixed structure the system comprising:

a support structure adapted to attach to the fixed structure;

at least one follower operably coupled to said support structure; and a display interface adapted to receive the flat panel display so that when the flat panel display is received on the display interface the display interface and said flat panel display together define a center of gravity, the display interface having a first curved guide structure defined therein, said first curved guide structure having a substantially constant radius of curvature with a center, said display interface operably coupled to support structure with said follower engaged with said first curved guide structure, whereby when the flat panel display is received on the display interface, the center of the radius of curvature is disposed proximate the center of gravity and said flat panel display is generally selectively rotatably positionable about an axis extending through said center, said display interface including a second curved guide structure located below the first curved guide structure, wherein said second curved guide structure has a substantially constant radius of curvature with a center substantially coincident with the center of said radius of curvature of said first curved guide structure, and wherein said mounting system further includes a second follower operably coupled to said support structure and engaged with said second curved guide structure.

2. The mounting system of claim 1, wherein said display interface is adapted to self-balance at a plurality of locations about said axis.

3. The mounting system of claim 1, wherein said first curved guide structure is a slot, and wherein said follower is a pin that is slidable in said slot.

4. The mounting system of claim 1, wherein said first curved guide structure is a slot, and wherein said follower is a pin that is rollable in said slot.

5. The mounting system of claim 1, wherein said support structure has a first support structure slot, and wherein said follower is engaged in said first support structure slot.

6. The mounting system of claim 1, wherein the support structure has a second support structure slot, and wherein the second follower is engaged in the second support structure slot.

7. The mounting system of claim 1, wherein the support structure comprises an articulating support structure, and wherein said articulating support structure is arranged so that said flat panel display is selectively rotatably positionable about a substantially vertical axis.

8. An adjustable, self-balancing, mounting system adapted for mounting a flat panel display on a fixed structure, the system comprising:

a support structure adapted to attach to the fixed structure;

at least one follower operably coupled to said support structure; and a display interface adapted to receive the flat panel display so that when the flat panel display is received on the display interface the display interface and said flat panel display together define a center of gravity, the display interface having a first curved guide structure defined therein, said first curved guide structure having a substantially constant radius of curvature with a center, said display interface operably coupled to the support structure with said follower engaged with said first curved guide structure, whereby when the flat panel display is received on the display interface, the center of the radius of curvature is disposed proximate the center of gravity and said flat panel display is generally selectively rotatably positionable about an axis extending through said center, the system faker comprising at least one friction member arranged so as to frictionally resist rotational movement of said display interface relative to said support structure and a first friction slot, wherein said at least one friction member is operably coupled to said support structure and engaged in said first friction slot.

9. The mounting system of claim 8, fiber comprising means for adjusting the amount of frictional resistance provided by at least one first friction member.

10. An adjustable, self-balancing flat panel display device and mounting system adapted for attachment to a fixed structure, the system comprising:

a flat panel display device;

a display interface on the flat panel display device, said flat panel display device and said display interface together defining a center of gravity, the display interface including at least one guide structure having a curved portion with a substantially constant radius of curvature centered proximate the center of gravity;

a support structure adapted to be attachable to said fixed structure and operably coupled to said display interface; and at least one follower operably coupled with said support structure and engaged with said guide structure, said flat panel display being thereby generally selectively rotatably positionable about an axis extending through the center of paid radius of curvature said display interface further including at least one friction member arranged so as to frictionally resist rotational movement of said display interface relative to said support structure and a first friction slot, wherein said at least one friction member is operably coupled to said support structure and engaged in said first friction slot.

11. The system of claim 10, wherein said display interface is dated to self-balance at a plurality of locations about said axis.

12. The mounting system of claim 10, wherein said at least one guide structure is a slot, and wherein said follower is a pin that is slidable in said slot.

13. The mounting system of claim 10, wherein said at least one guide structure is a slot, and wherein said follower is a pin that is rollable in said slot.

14. The mounting system of claim 10, wherein said support structure has a first support structure slot, and wherein said follower is engaged in said first support structure slot.

15. The mounting system of claim 10, further comprising means for adjusting the amount of fictional resistance provided by at least one first friction member.

16. The mounting system of claim 10, wherein the support structure comprises an articulating support structure, and wherein said articulating support structure is arranged so that said flat panel display is selectively rotatably positionable about a substantially vertical axis.

* * * * *

UNITED STATES PATENT AND TRADEMARK OFFICE
CERTIFICATE OF CORRECTION

PATENT NO. : 6,905,101 B1
DATED : June 14, 2005
INVENTOR(S) : Dittmer

It is certified that error appears in the above-identified patent and that said Letters Patent is hereby corrected as shown below:

Column 2,
Line 33, delete "an" and insert -- a --.

Column 4,
Line 4, after "well" insert -- as --.

Column 6,
Line 4, delete "invention" and insert -- Invention --.
Line 16, after "structure" insert -- , --.
Line 20, after "to" insert -- the --.

Column 7,
Line 3, after "and" begin a new paragraph with -- a display interface adapted... --.
Line 17, delete "faker" and insert -- further --.
Line 24, delete "fiber" and insert -- further --.

Column 8,
Line 8, delete "paid" and insert -- said --.
Line 15, delete "dated" and insert -- adapted --.

Signed and Sealed this

Twentieth Day of September, 2005

JON W. DUDAS
*Director of the United States Patent and Trademark Office*